(12) United States Patent
Scouller et al.

(10) Patent No.: US 10,216,564 B2
(45) Date of Patent: *Feb. 26, 2019

(54) HIGH VOLTAGE FAILURE RECOVERY FOR EMULATED ELECTRICALLY ERASABLE (EEE) MEMORY SYSTEM

(71) Applicant: NXP USA, Inc., Austin, TX (US)

(72) Inventors: Ross S. Scouller, Austin, TX (US); Jeffrey C. Cunningham, Austin, TX (US); Daniel L. Andre, Austin, TX (US); Tim J. Coots, Austin, TX (US)

(73) Assignee: NXP USA, Inc., Austin, TX (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/390,789

(22) Filed: Dec. 27, 2016

(65) Prior Publication Data

US 2017/0109224 A1 Apr. 20, 2017

Related U.S. Application Data

(63) Continuation of application No. 14/484,876, filed on Sep. 12, 2014, now Pat. No. 9,563,491.

(51) Int. Cl.
*G06F 11/07* (2006.01)

(52) U.S. Cl.
CPC .......... *G06F 11/079* (2013.01); *G06F 11/073* (2013.01); *G06F 11/0727* (2013.01); *G06F 11/0751* (2013.01); *G06F 11/0787* (2013.01); *G06F 11/0793* (2013.01)

(58) Field of Classification Search
CPC ..... G06F 11/07; G06F 11/0709; G06F 11/079
USPC ......................................................... 714/37
See application file for complete search history.

(56) References Cited

U.S. PATENT DOCUMENTS

| 5,768,497 | A | * | 6/1998 | Uemura | ................ | G06F 11/261 |
| | | | | | | 714/28 |
| 2008/0126863 | A1 | * | 5/2008 | Co | ......................... | G11C 29/56 |
| | | | | | | 714/29 |
| 2009/0217102 | A1 | * | 8/2009 | Co | ......................... | G11C 29/56 |
| | | | | | | 714/42 |
| 2014/0244895 | A1 | * | 8/2014 | Scouller | .............. | G06F 12/0246 |
| | | | | | | 711/103 |
| 2014/0258792 | A1 | * | 9/2014 | Scouller | ............... | G11C 16/349 |
| | | | | | | 714/57 |
| 2016/0077906 | A1 | * | 3/2016 | Scouller | ................ | G06F 11/073 |
| | | | | | | 714/33 |

* cited by examiner

Primary Examiner — Kamini B Patel

(57) ABSTRACT

The present disclosure provides methods and circuits for managing failing sectors in a non-volatile memory. A record address and a read control signal are received, where the record address identifies a location in the non-volatile memory. The record address is compared with a plurality of dead sector addresses, where the dead sector addresses correspond to a subset of sectors located in the non-volatile memory. Data located at the record address is determined to be invalid in response to a combination of a first detection that the record address matches one of the dead sector addresses and a second detection that the read control signal indicates a read operation is requested to be performed on the non-volatile memory.

20 Claims, 9 Drawing Sheets

| | STATUS INDICATOR 430 | | | | |
|---|---|---|---|---|---|
| | DEAD STATUS (STEP 2) 425 | DEAD STATUS (STEP 1) 420 | READ-ONLY STATUS (STEP 2) 415 | READ-ONLY STATUS (STEP 1) 410 | SECTOR ADDRESS AND PARITY BITS 405 |
| DEFAULT (HEALTHY) ENTRY 450(1) | 0xF | 0xF | 0xF | 0xF | 0xFFFF |
| INTERMEDIATE ENTRY 450(2) | 0xF | 0xF | 0xF | 0xF | 0x000A |
| READ-ONLY ENTRY (STEP 1 COMPLETE) 450(3) | 0xF | 0xF | 0xF | 0x0 | 0x000A |
| READ-ONLY ENTRY (STEP 2 COMPLETE) 450(4) | 0xF | 0xF | 0x0 | 0x0 | 0x000A |
| READ-ONLY-TO-DEAD ENTRY (STEP 1 COMPLETE) 450(5) | 0xF | 0x0 | 0x0 | 0x0 | 0x000A |
| READ-ONLY-TO-DEAD ENTRY (STEP 2 COMPLETE) 450(6) | 0x0 | 0x0 | 0x0 | 0x0 | 0x000A |
| DEAD ENTRY (STEP 1 COMPLETE) 450(7) | 0xF | 0x0 | 0xF | 0xF | 0x000A |
| DEAD ENTRY (STEP 2 COMPLETE) 450(8) | 0x0 | 0x0 | 0xF | 0xF | 0x000A |

FIG. 4

HIGH VOLTAGE FAILURE RECOVERY FOR EMULATED ELECTRICALLY ERASABLE (EEE) MEMORY SYSTEM

CROSS-REFERENCE TO RELATED APPLICATIONS

This application is a continuation of U.S. patent application Ser. No. 14/484,876 having a filing date of Sep. 12, 2014, common inventors, common assignee, which is incorporated by reference in its entirety.

BACKGROUND

Field

This disclosure relates generally to memory systems, and more specifically, to operating an emulated electrically erasable (EEE) memory system.

Related Art

Emulated electrically erasable (EEE) memory systems typically include a random access memory (RAM) and a non-volatile memory that is electrically erasable, where the non-volatile memory is much larger than the RAM. The non-volatile memory and the RAM together implement an EEE memory system that emulates an electrically erasable memory that operates as if it were only the size of the RAM. The EEE memory system has increased endurance over a regular non-volatile memory having a size comparable to that of the RAM. EEE memory systems are useful in situations in which endurance and small sector size is important, such as in automotive applications where data is updated often and must be stored in a non-volatile manner. It is important that EEE memory systems are able to cope with various failure mechanisms, which can be especially disastrous in an automotive environment.

BRIEF DESCRIPTION OF THE DRAWINGS

The present invention may be better understood, and its numerous objects, features, and advantages made apparent to those skilled in the art by referencing the accompanying drawings.

FIG. 4 illustrates sector status information maintained by sector management logic, according to some embodiments.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

Some EEE (emulated electrically erasable) memory systems are unable to cope with a failure mechanism that occurs during high voltage operations, which makes all future high voltage operations within a sector unreliable. Effects of such a failure mechanism include: erase operations leaving an entire sector only partially erased, sector identifier (ID) update operations updating a sector ID to a fixed or unknown value, writing operations failing to write a record to any location within an entire sector, and sector ID update operations failing to update sector IDs of sectors that need to be erased or invalidated. The impact of such a failure mechanism on an EEE memory system would eventually lead to an inability of the EEE memory system to function and the loss of all data.

The present disclosure provides for a high voltage failure recovery scheme for a EEE memory system by tracking two types of failed sectors: sectors that are dead to any new high voltage operations (e.g., write operations) but still contain valid data that is required to be referenced (e.g., read operations), and sectors that are no longer actively participating in the EEE scheme (e.g., no longer read from or written to). Failed sectors are tracked using sector status, which is stored using a brownout tolerant approach. The sector status is used in hardware to block the transfer of invalid data during automated record search and copy down actions. The sector status is also used in software when determining whether to perform high voltage operations on a sector, such as when an update occurs within a sector, in order to avoid writing to a failed sector. Also, since failed sectors are identified by sector status, the failed sectors need not be erased (since such erase operation will continue to fail to completely erase the failed sector), but are simply avoided during high voltage operations, which eliminates exposing the EEE memory system to unnecessary (and unsuccessful) high voltage operations that would only serve to reduce reliability of the EEE memory system. Accordingly, the present disclosure extends the operating life of the EEE memory system and improves overall endurance.

Example Embodiments

Figure 1:
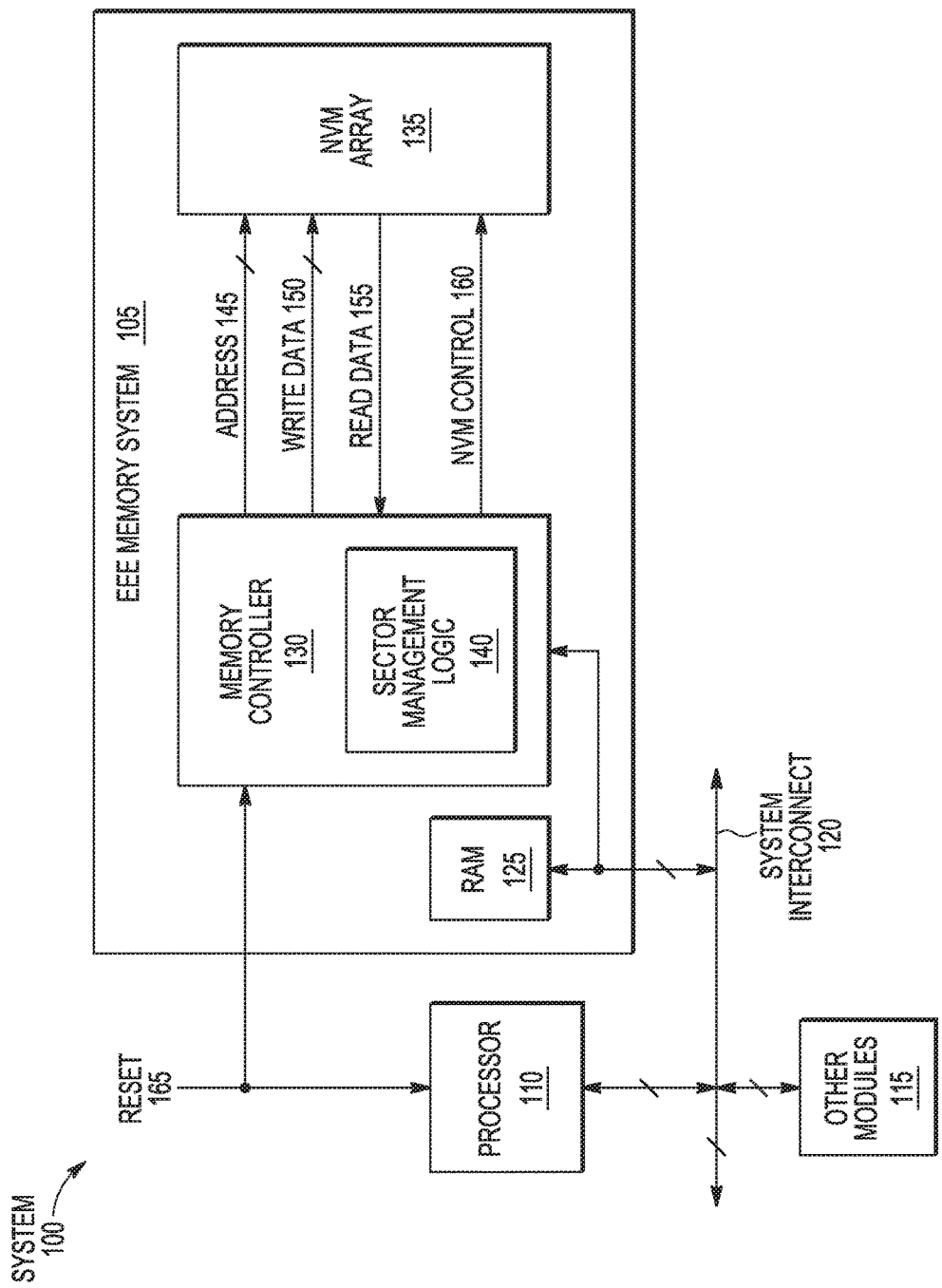
FIG. 1 illustrates a block diagram depicting an example emulated electrically erasable (EEE) memory system in which the present disclosure is implemented, according to some embodiments.

FIG. 1 illustrates a block diagram depicting a system 100 that includes an example emulated electrically erasable (EEE) memory system 105 in which the present disclosure is implemented. System 100 also includes a processor 110, other module(s) 115 (if any), and a system interconnect 120. Each of processor 110, other module(s) 115, and EEE memory system 105 are bidirectionally coupled to system interconnect 120. EEE memory system 105 includes random access memory (RAM) 125, a memory controller 130, sector management logic 140, and a non-volatile memory (NVM) array 135 (such as a flash array or any other type of NVM formed using a semiconductor substrate). A reset signal 165 is provided to processor 110 and memory controller 130. This reset signal may be, for example, a global reset signal for system 100.

RAM 125, which may be considered a volatile memory, is bidirectionally coupled to system interconnect 120 and to memory controller 130. Memory controller 130 is coupled to system interconnect 120 and NVM array 135. Sector management logic 140, which is part of memory controller 130, is coupled to NVM array 135. Memory controller 130 is configured to communicate control signals 160 with NVM array 135 and to provide an address 145 and write data 150 to NVM array 135 and to receive read data 155 from NVM array 135. NVM array 135 is further discussed below in connection with FIG. 2 and sector management logic 140 is further discussed in connection with FIG. 3.

Processor 110 can be any type of processor, such as a microprocessor, digital signal processor, and the like, or may be any other type of interconnect master that can access EEE memory system 105. In one form, system interconnect 120 is a system bus. Other forms of interconnect may be used including, for example, crossbars, point-to-point connections, and optical and wireless transmission techniques. Other modules 115 may include any type of module, such as, for example, another memory, another processor, another interconnect master, a peripheral, an input/output (I/O) device, and the like. Alternatively, no other modules may be present in system 100.

In operation, processor 110 can send access requests (read or write access requests) to EEE memory system 105. The access requests from processor 110, which include an access address and, in the case of a write access, associated write data, are provided to RAM 125. In the case of a read access, RAM 125 provides processor 110 the data stored at the received access address location. In the case of a write access, RAM 125 stores the received write data at the received access address location. Further in the case of a write access, memory controller 110 may detect such an update of RAM 125 and selectively store the received access address and associated write data to NVM array 135 in a logically sequential manner. For example, in the case of an update (a write) to RAM 125, the received access address and associated write data are used to form a record that is written to NVM array 135 at the next available location. This next available location is logically sequential to a location that was loaded during an immediately preceding loading of NVM array 135. It is noted that, referring to FIG. 1, the received access address can be provided as address 145 to NVM array 135 and the associated write data as write data 150 to NVM array 135. In one example, the writing of the record corresponding to the RAM update is only performed (or stored in NVM array 135) if the value that is currently stored at the RAM location is different from the new write value associated with the write access request for that RAM location. In this manner, NVM array 135 can store the updated values of RAM 125 in a more permanent manner. That is, when RAM 125 loses power, its data is lost. Upon restoring power, the values of the RAM 125 may be restored (e.g., read) from NVM array 135, which does not lose its data upon losing power. In one embodiment, NVM array 135 has a greater storage capacity than RAM 125. For example, NVM array 135 may have a capacity of at least four times greater than RAM 125 and typically much larger than that.

Figure 2:
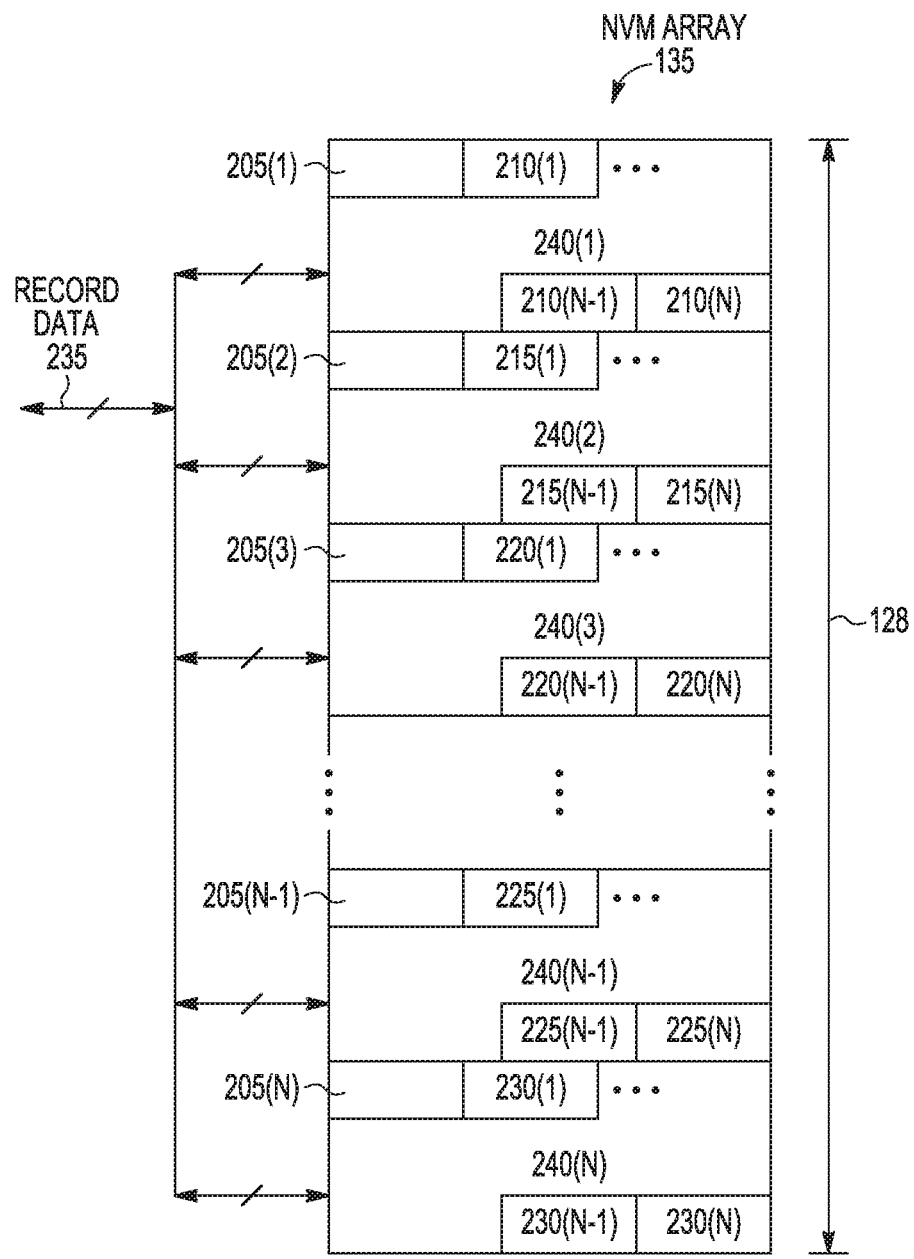
FIG. 2 illustrates a block diagram depicting an example non-volatile memory of the EEE memory system, according to some embodiments.

FIG. 2 illustrates a block diagram depicting an example non-volatile memory array 135 of the EEE memory system 105. NVM array 135 has a plurality of sectors 240(1)-(N), where each sector 240 includes a plurality of blocks. As illustrated, sector 240(1) includes a plurality of blocks 210(1)-(N), sector 240(2) includes a plurality of blocks 215(1)-(N), sector 240(3) includes a plurality of blocks 220(1)-(N), and so on. Each block 220 is configured to store a record. Each block is identified by a memory address, which is a unique physical address that identifies the location of the block in NVM array. A sector is also identified by a memory address, such as the memory address of the first block included in the sector. In the embodiment shown, NVM array 135 has 64 sectors that each has 2 kb (kilobytes) of memory, giving NVM array 135 a size of 128 kb. Each sector is coupled to sector management logic 140 and to memory controller 130.

Each record is stored in NVM array 135 at an available location (or available block 220) in NVM array 135, where the memory address of a record is also referred to as a record address. Memory controller 130 is configured to write records to NVM array 135 in a logically sequential manner at subsequent locations within the NVM array 135, where each subsequent location is identified by an incremented record address. Memory controller 130 successively writes records to locations within blocks of a sector, such as successively writing records to block 210(1) of sector 240(1), then to block 210(2), and so on through block 210(N). Once the sector is full (e.g., records have been written to all blocks in the sector), memory controller 130 successively writes records to locations within a subsequent sector, such as to block 215(1) of next sector 240(2). Memory controller 130 continues writing records to NVM array 135 in a structured manner, such as "round robin" manner or cyclical manner, through the locations in NVM array 135, where the oldest full sector is erased and new records are written to the sector.

Memory controller 130 is also configured to track the record address of the last written location (also referred to as the last written record address) and to determine a next record address to which a next record can be written, such as by incrementing the last written record address to determine a next possible record address. Memory controller 130 is also configured to read records from NVM array 135 located at one or more record addresses. Record data bus 235 is configured to communicate write data 150 and read data 155 between memory controller 130 and NVM array 135, as needed.

Each sector also has a location in NVM array 135 that is identified by a memory address (also referred to as a sector address). A memory address includes a number of bits that identifies the sector in which the memory address is located. Accordingly, each record address includes a specific sector number in which the respective record is located, and each sector address includes a specific sector number of the respective sector.

Each sector also includes a reserved block 205, which is a reserved section of memory that stores information about the respective sector, such as a sector identifier (ID) for the respective sector and sector status. A sector ID implements a unique coding algorithm, where the sector ID includes a number of bits that indicate a present erase lifecycle stage (also referred to as an erase status) of the respective sector, such as whether the sector is successfully erased or is ready for records to be added. The sector ID is progressed through the erase lifecycle by multiple program steps performed by the memory controller 130. Conventionally, if the memory controller 130 is unable to program or update a given sector ID, memory controller 130 will be unable to progress to the next sector ID and will eventually fail EEE memory system 105. Some example sector IDs and their progression through the sector lifecycle is shown in Table 1 below.

The present disclosure provides that if the memory controller 130 fails to program (or update) a sector ID to a particular lifecycle stage, sector management logic 140 is configured to update a sector status of the sector in response to such a program failure. Table 1 also shows the resulting sector status (also referred to as failure status) in response to program failure of each lifecycle stage. A sector's failure status may indicate that the sector has "dead" status (or a sector where data is no longer written to or read from the sector), "read-only" status (or a "zombie" sector to which data is no longer written, but the sector still contains data that is read), or "read-only-to-dead" status (or a sector whose "read-only" status changes to "dead" status). Sectors without these statuses are considered to have healthy status, where data can be successfully written to sectors with healthy status while skipping sectors with unhealthy status (e.g., dead, read-only, and read-only-to-dead status), and where data can be successfully read from sectors with healthy status and read-only status. Sector management logic 140 is configured to use sector status to determine whether to read data from or write data to the respective sector, as further discussed below in connection with FIG. 3.

A sector with healthy status that fails to be erased is automatically categorized as having dead status. A sector with healthy status that suffers a failure to program sector ID error is categorized as having either read-only or dead status, as further discussed below. Read-only status is generally maintained until the sector becomes the oldest full sector and needs to be erased, at which point the sector's status is updated to read-only-to-dead status, which indicates data is no longer written to or read from the sector. Sector IDs of sectors with read-only status and dead status are not programmed (or updated). Dead status and read-only-to-dead status are maintained for the sector for the life of the EEE system, which indicates data is no longer written to or read from the sector. Sector status is also shown in Table 1. Sector status is further discussed below in connection with FIG. 4, and maintaining the sector status is further discussed below in connection with FIG. 7 (e.g., updating sector status when a failure to program sector ID is detected) and FIG. 8 (e.g., updating sector status when time to erase the sector).

TABLE 1

(Sector Status)

| Lifecycle Stage | Value | Description | Sector Status on Program Failure |
|---|---|---|---|
| ERASED | 0xFFFF | Erased sector | Not dead |
| READY | 0xFFEE | First step qualifying erase | DEAD |
| READYQ | 0xEEEE | Qualified erase sector | DEAD |
| FULL | 0xEECC | First step prior to adding records | DEAD |
| FULLQ | 0xCCCC | Qualified to add records | DEAD |
| FULLE | 0xCC44 | Previous sector ready to be erased | READ-ONLY |
| FULLEQ | 0x4444 | Previous sector qualified to be erased | READ-ONLY |
| FULLC | 0x4400 | Previous sector ready for compress | READ-ONLY |
| FULLCQ | 0x0000 | Previous sector qualified for compress | READ-ONLY |

Figure 3:
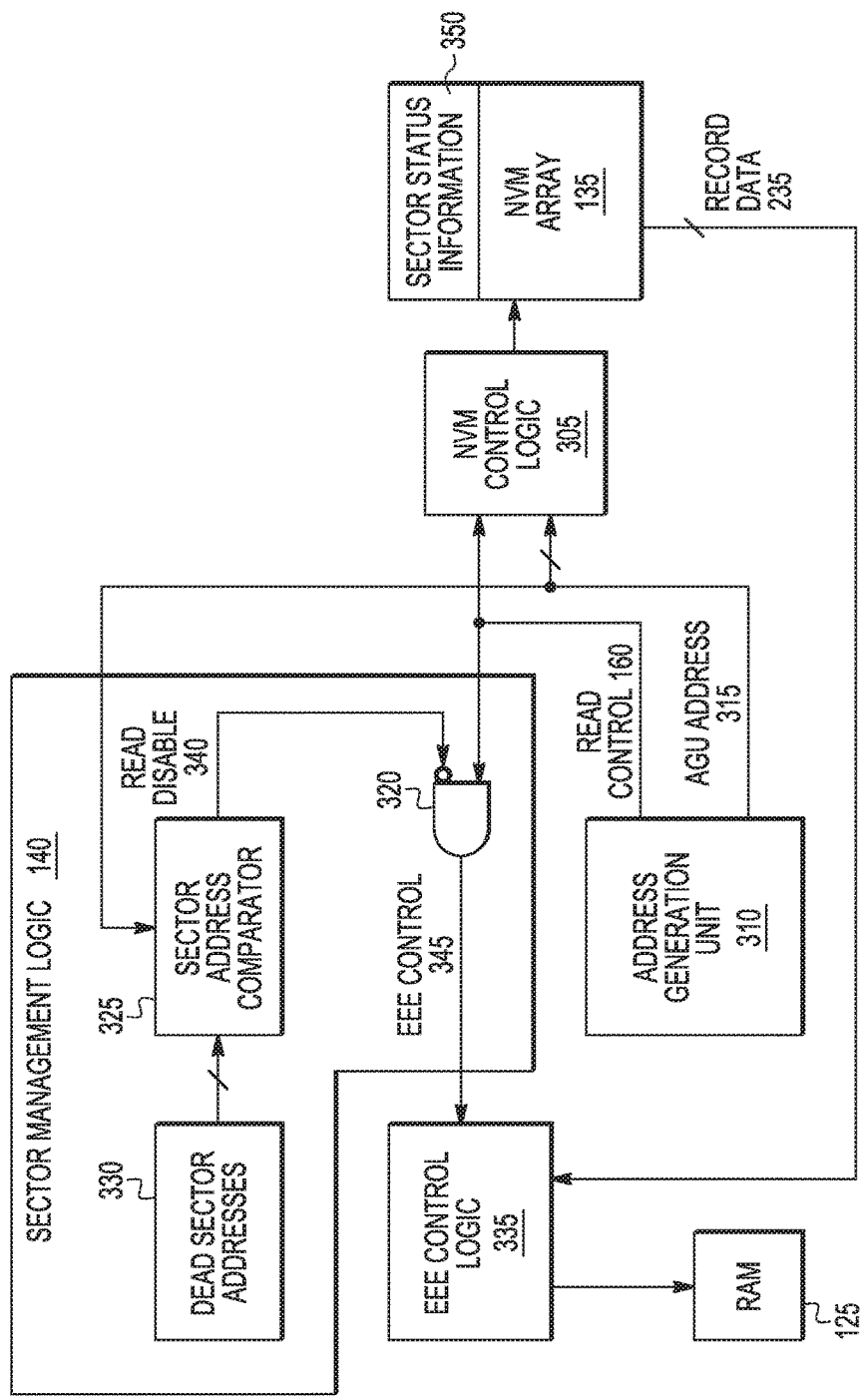
FIG. 3 illustrates a block diagram depicting components of an example EEE memory controller including sector management logic in which the present disclosure is implemented, according to some embodiments.

FIG. 3 illustrates a block diagram depicting components of an example EEE memory controller 130 including sector management logic 140 in which the present disclosure is implemented. Example processing paths for NVM read operations are illustrated in FIG. 3. EEE memory controller 130 also includes an address generation unit 310 and memory control logic that includes NVM control logic 305 and EEE control logic 335. Address generation unit (AGU) 310 is configured to generate addresses that meet a type of structured address sequence used by the EEE system in NVM array 135, such as producing addresses that identify logically sequential locations and unique patterns in NVM array 135, repeating in a "round robin" or cyclical manner through the locations in NVM array 135. AGU 310 has outputs including read control signal 160 and an address 315 generated by AGU 310 (also referred to as AGU address 315), which are coupled to inputs of NVM control logic 305. Read control signal 160 indicates whether a read operation is requested to be performed on NVM array 135. NVM control logic 305 is configured to implement read operations for NVM array 135 using AGU address 315 in response to an active read control signal 160 (and to implement write operations for RAM 125 using decoded record data 235 in response to an active write control signal). During a read operation, NVM array 135 is configured to provide record data 235 (e.g., data read from NVM array 135) to EEE control logic 335. EEE control logic 335 is configured to analyze the provided record data 235, and may use the record data 235 to update RAM 125 (e.g., during an automated copy down action) or to search for a requested record (e.g., during an automated search action). A copy down action is further discussed below in connection with FIG. 5 and a search action is further discussed below in connection with FIG. 6.

Sector management logic 140 is configured to receive read control signal 160 and AGU address 315 as inputs and has an output coupled to an input of EEE control logic 335. Sector management logic 140 includes a sector address comparator circuit 325 and a listing of a plurality of dead sector addresses 330. Dead sector addresses 330 is a volatile memory space (e.g., flopped registers) that is populated with the addresses of sectors that have a dead status or a read-only-to-dead status. In the discussion of dead sector addresses below, sectors with dead status and read-only-to-dead status contain invalid record data that is not available for reading and are not written with any new record data, and are referred to herein as dead sectors. The sector addresses and corresponding sector statuses are stored in reserved blocks 205(1)-(N) in NVM array 135, represented by sector status information 350 of NVM array 135, which is further discussed below in connection with FIG. 4. Sector management logic 140 populates dead sector addresses 330 on system startup (e.g., on reset). Dead sector addresses 330 can also be a lookup table or other ordered data structure that is configured to be searched.

In some embodiments, sector address comparator 325 is configured to compare incoming AGU address 315 with the dead sector addresses 330 and outputs a read disable signal 340 based on the comparison. If sector address comparator 325 detects that the AGU address 315 matches one of the dead sector addresses 330, sector address comparator 325 sets the read disable signal 340 (e.g., makes active), indicating that the AGU (or record) address is located within a dead sector (i.e., a sector having dead status or read-only-to-dead status). If sector address comparator 325 detects that the AGU address 315 does not match any of the dead sector addresses 330, sector address comparator 325 clears the read disable signal 340 (e.g., makes inactive), indicating that the AGU (or record) address is not located within a dead sector.

In other embodiments, sector address comparator 325 need not compare the full AGU address with each full dead sector address, but instead is configured to compare the sector numbers of both the AGU address and the dead sector addresses. As noted above, each memory address includes a number of bits that indicates the sector in which the memory address is located. In such an embodiment, sector address comparator 325 compares the specific sector number of the AGU address with the specific sector number of each dead sector address. In doing so, a smaller number of bits are required to be stored for each dead sector address in dead sector addresses 330 (e.g., a smaller register is needed to store a specific sector number of a sector, rather than the full memory address of the sector), which reduces the amount of volatile memory space used by dead sector addresses 330 (as compared to storing the full memory address of the dead sectors).

Sector management logic 140 also includes a logic gate circuit 320 that outputs an EEE control signal 345. Logic gate 320 has a first input coupled to the read disable 340 output of sector address comparator 325. Logic gate 320 also has a second input coupled to read control signal 160. Logic gate 320 outputs EEE control signal 345 based on the values of read disable signal 340 and read control signal 160. Logic gate 320 is configured to detect the combination of read disable signal 340 being active (indicating the record address is located in a dead sector) and read control signal 160 being active (indicating an AGU read operation is requested). During an NVM read operation (as indicated by read control signal 160), if read disable 340 is active, logic gate 320 is configured to output EEE control signal 345 that indicates to EEE control logic 335 that the record data 235 read from NVM array 135 is invalid (due to record data 235 being read from an address located in a dead sector) and should be discarded (and not used to update RAM 125). If read disable 340 is inactive, EEE control signal 345 indicates to EEE control logic 335 that the read operation is performed as usual (e.g., using record data 235 to update RAM 125 since record data 235 is read from an address not located in a dead sector). In other words, EEE control signal 345 overrides EEE control logic 335 during a read operation of a dead sector in order to discard the data read from the dead sector. In some embodiments, logic gate 320 implements an AND function.

FIG. 4 illustrates sector status information 350 maintained by sector management logic 140. Each sector in NVM array 135 stores a sector status entry 450 at a reserved block 205 of the sector, where the sector status entry is generated and maintained (e.g., updated) by sector management logic 140. Sector status information 350 represents the plurality of sector status entries of the sectors in NVM array 135. Each sector status entry includes a sector address 405 of the sector (and parity bits) and a status indicator 430 that indicates the failure status of the sector. Sector indicator 430 (also referred to as a failure status indicator 430) indicates one of four failure statuses: dead, read-only, read-only-to-dead, and healthy. Sector status (which is also referred to herein as failure status) is determined in a distributive, brownout tolerant manner using multiple qualification steps to test the sector for status, in order to preserve the status in case of system failure that may occur while determining the status. For example, after attempting to erase the sector, memory controller 130 tests the sector (or performs an erase qualification step) to confirm whether the erase was successful. Similarly, after attempting to program the sector ID, memory controller 130 tests the sector ID (or performs a program qualification step) to confirm whether the programming was successful.

Status indicator 430 includes a first set of read-only status bits 410, a second set of read-only status bits 415, a first set of dead status bits 420, and a second set of dead status bits 425. The status bits 410, 415, 420, and 425 (or status indicator 430) together indicate the status of the sector, as further discussed below. In some embodiments, status bits 410, 415, 420, and 425 each include 4 bits and sector address 405 includes 22 bits (or 16 bits plus 6 bits parity).

Example sector status entries 450(1)-(8) are illustrated in FIG. 4. In some embodiments, a default sector status entry 450(1) is initially created for each sector (e.g., on an initial system startup). In other embodiments, a default sector status entry 450(1) is created for a sector when the sector's status is no longer healthy, as further discussed below. Status bits 410, 415, 420, and 425 of each default sector status entry 450(1) are set to a default indicator value (e.g., 0xF) used to identify healthy sectors. The sector address 405 is also set to a default address value (e.g., 0xFFFF). Sector status entries progressed or updated by a number of sequential program operations performed by sector management logic 140 to reflect the status of the respective sector. The program operations are configured to update a given entry from right to left (e.g., from sector address 405 to dead status bits 425). The program operations are performed in response to a failure to program sector ID of a sector, a failure to erase a sector, and a sector having read-only status becoming the oldest full sector that needs to be erased. A default entry 450(1) can be progressed to a read-only entry 450(4), which in turn can be progressed to a read-only-to-dead entry 450(6), and a default entry 450(1) can be alternatively progressed to a dead entry 450(8), as discussed below.

In response to a failure to program sector ID of a sector, sector management logic 140 updates the sector's associated default entry 450(1) with the sector address. To do this, sector management logic 140 performs a program operation to overwrite the default address value with the sector address (and parity bits) 405 in the default entry 450(1), resulting in an intermediate entry 450(2). Depending on the sector lifecycle stage during which the failure to program occurred (as shown in Table 1 above), sector management logic 140 updates intermediate entry 450(2) to a read-only entry (step 1) 450(3) or to a dead entry (step 1) 450(7), as discussed below.

If the sector lifecycle stage is FULLE, FULLEQ, FULLC, or FULLCQ, sector management logic 140 updates the intermediate entry 450(2) to a read-only entry 450(3) by performing a program operation to overwrite read-only status bits 410 with a read-only indicator value (e.g., 0x0) upon completion of program qualification step 1. Sector management logic 140 then updates read-only entry 450(3) to a read-only entry 450(4) by performing a next program operation to overwrite read-only status bits 415 with a read-only indicator value (e.g., 0x0) upon completion of program qualification step 2. As noted above, sectors with read-only status contain record data that is still available for reading, but are not written with any new record data. The sector ID of a sector with read-only status is no longer updated because the sector ID has already failed to program.

If the sector lifecycle stage is READY, READYQ, FULL, or FULLQ, sector management logic 140 updates the intermediate entry 450(2) to a dead entry 450(7) by performing a program operation to overwrite dead status bits 420 with a dead indicator value (e.g., 0x0) upon completion of program qualification step 1. Sector management logic 140 then updates dead entry 450(7) to dead entry 450(8) by performing a next program operation to overwrite dead status bits 425 with a dead indicator value (e.g., 0x0) upon completion of program qualification step 2. As noted above, sectors with dead status contain invalid record data that is not available for reading, and are not written with any new record data.

A read-only entry also becomes a read-only-to-dead entry when a sector associated with a read-only entry fails on erase. Data is stored in NVM array 135 in a structured manner (e.g., round robin manner), where an oldest full sector is identified in NVM array 135 by memory controller 130 and is erased in order to provide locations for new incoming record data. As discussed above, a sector with healthy status that fails to erase is updated by sector management logic 140 to a dead entry 450(8). In response to a sector with read-only status becoming the oldest full sector that needs to be erased, memory controller 130 need not erase the sector, but sector management logic 140 updates the sector's associated read-only entry 450(4) to a read-only-to-dead entry 450(5). Sector management logic 140 performs a program operation to overwrite the dead status bits 420 with the dead indicator value (e.g., 0x0) upon completion of erase qualification step 1. Sector management logic 140 updates read-only-to-dead entry 450(5) to read-only-to-dead entry 450(6) by performing a next program operation to overwrite the dead status bits 425 with the dead indicator value (e.g., 0x0) upon completion of erase qualification step 2. Read-only-to-dead entry 450(6) and dead entry 450(8) both include dead status bits 420 and 425 set to the dead indicator value, which indicates that a sector is "dead" (or that data is no longer read from or written to the sector).

In response to a sector with dead status becoming the oldest full sector that needs to be erased, memory controller 130 need not erase the sector, but sector management logic 140 updates the next sector ID of the next sector that does not have dead or read-only-to-dead status as the oldest full sector, indicating the next sector should be compressed. The next sector will be erased after compression. If the next sector ID fails to be programmed or updated, sector management logic 140 continues to attempt to update a next sector ID of a following next sector (that does not have dead or read-only-to-dead status) until successful. The sector continues to have dead status or read-only-to-dead status, which indicates to sector management logic 140 that no data should be read from or written to the sector. The status of any sectors whose next sector ID failed to be programmed is also updated as discussed above.

Figure 5:
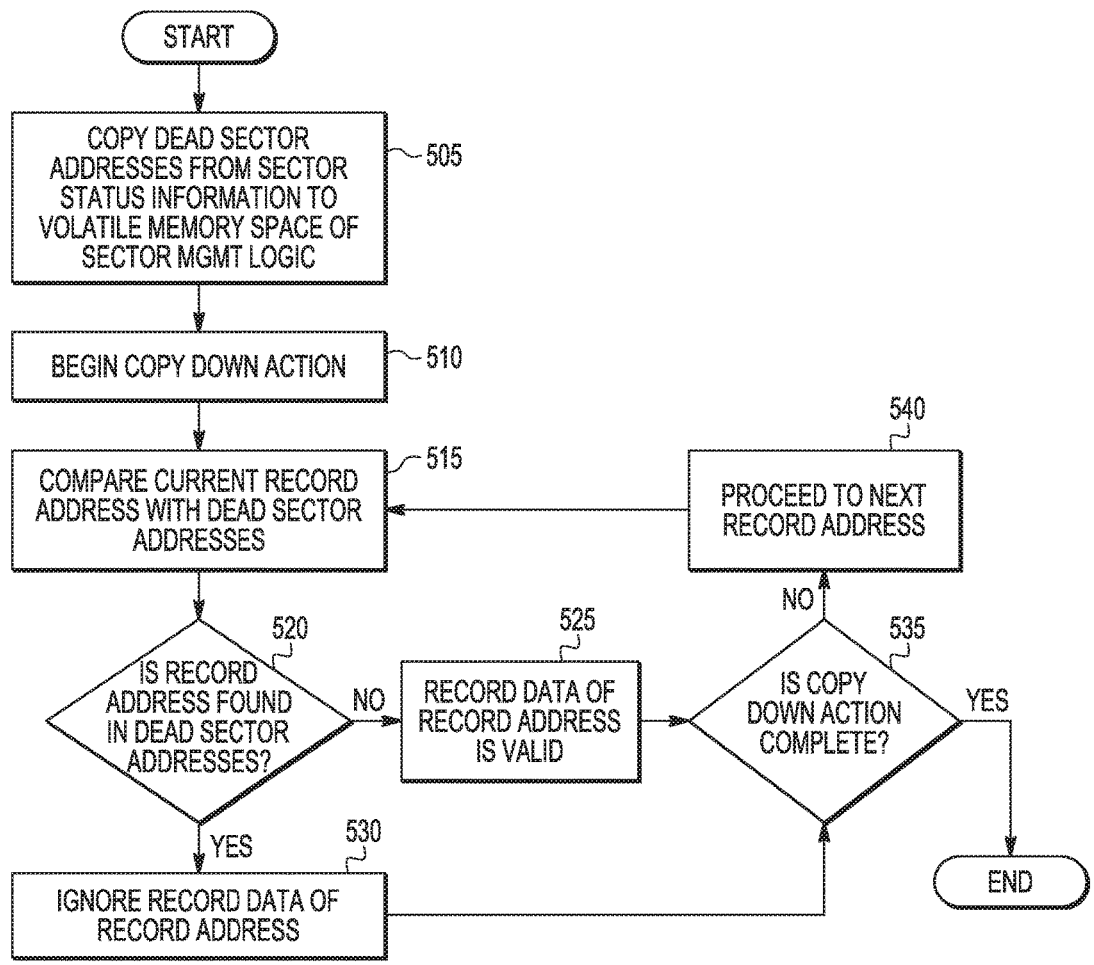
FIG. 5 illustrates a flowchart depicting a copy down process implemented by sector management logic, according to some embodiments.

FIG. 5 illustrates a flowchart depicting a copy down process implemented by memory controller 130 and sector management logic 140. The process illustrated in FIG. 5 is triggered in response to a copy down action initiated by memory controller 130 to populate RAM 125 using the data stored in NVM array 135, such as on restart of system 100. The process begins at operation 505, where sector management logic 140 copies the dead sector addresses from sector status information 350 of the NVM array 135 (e.g., from sector status information blocks 205(1)-(N)) to a volatile dead sector address memory space 330 of sector management logic 140 (e.g., flopped registers). Dead sector addresses are identified by being associated with a sector status entry having dead status bits 420 and 425 set to a dead indicator value (such as 0x0), which includes sectors with dead status and read-only-to-dead status. Once a dead sector address is identified, the dead sector address is written to memory space 330. In other embodiments, sector management logic 140 writes the specific sector number of each dead sector address to the volatile memory space (e.g., logic 140 programs each flopped register with a sector number). The process continues to operation 510, where memory controller 130 begins the copy down action, which is implemented as an automatic action, such as being implemented in hardware. In embodiments where the copy down action is implemented in hardware, the following operations are also implemented in hardware (e.g., operations 515-540).

The process continues to operation 515, where sector address comparator 325 compares the current record address with the dead sector addresses 330. The current record address is generated by address generation unit 310, where the current record address compared during a first iteration of operation 515 is an initial starting location in NVM array 135 that contains the oldest record written to NVM array 135. In other embodiments, sector address comparator 325 compares the specific sector number of the current record address with the specific sector number of each dead sector address.

The process continues to operation 520, where sector address comparator 325 determines whether the current record address is found in the dead sector addresses (or the current sector number matches a sector number of one of the dead sector addresses). If the current record address (or current sector number) is found, the current record address is determined to be located in a dead sector (e.g., a sector with dead status or read-only-to-dead status) and the process continues to operation 530, where the record data that is read from the current record address is identified as invalid and is ignored. As discussed above, logic gate 320 outputs an EEE control signal 345 that indicates to EEE control logic 335 that the record data is invalid, where EEE control logic 335 is configured to ignore (e.g., discard) the record data in response to the EEE control signal 345 (and not use the record data to update RAM 125).

The process continues to operation 535, where address generation unit 310 determines whether the copy down action is complete (e.g., address generation unit 310 has already reached the newest record written to NVM array 135). If the copy down action is not complete, the process continues to operation 540, where address generation unit 310 proceeds to the next record address of NVM array 135. Address generation unit 310 is configured to generate a logically sequential address for a next location in NVM array 135 (such as by incrementing the address to a subsequently written location). The process then returns to operation 515, where sector address comparator 325 compares the current record address (which is the next record address of operation 540) with the dead sector addresses. In other embodiments, comparator 325 compares the sector number of the current record address with the dead sector numbers. Thus during the copy down action, address generation unit 310 iterates forward through the locations in NVM array 135, ignoring those locations in dead sectors. Returning to operation 535, if the copy down action is complete, the process ends.

Returning to operation 520, if the current record address is not found in dead sector addresses 330, the current record address is determined to be located in a non-dead sector (e.g., a sector with read-only status or healthy status) and the process continues to operation 525, where the record data read from the current record address is determined to be valid and is used to update RAM 125 in the copy down action. As discussed above, logic gate 320 outputs the EEE control signal 345 that indicates to EEE control logic 335 that the record data is valid, where EEE control logic 335 is configured to use the record data to update RAM 125 in the copy down action. The process continues to operation 535, as discussed above.

Figure 6:
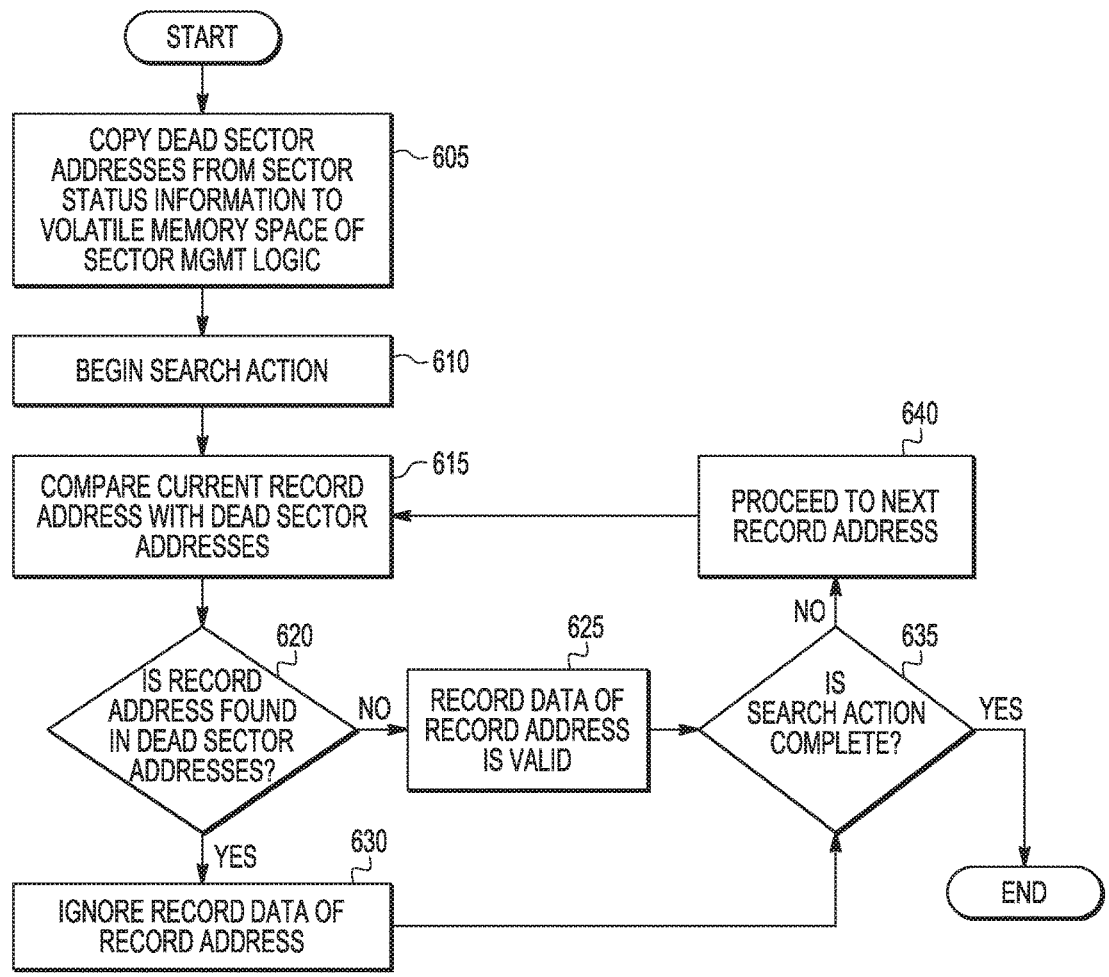
FIG. 6 illustrates a flowchart depicting a search process implemented by sector management logic, according to some embodiments.

FIG. 6 illustrates a flowchart depicting a search process implemented by memory controller 130 and sector management logic 140. The process illustrated in FIG. 6 is triggered in response to a search action initiated by memory controller 130 to search for requested data stored in NVM array 135 (e.g., such as when searching for any existing records that correspond to an updated record's memory address, as further discussed below in connection with FIG. 9). The process begins at operation 605, where sector management logic 140 copies the dead sector addresses from sector status information 350 of the NVM array 135 (e.g., from sector status information blocks 205(1)-(N)) to a volatile dead sector address memory space 330 of sector management logic 140 (e.g., flopped registers). As described above, dead sector addresses are identified by being associated with a sector status entry having dead status bits 420 and 425 set to a dead indicator value (such as 0x0), which includes sectors with dead status and read-only-to-dead status. Once a dead sector address is identified, the dead sector address is written to memory space 330. In other embodiments, sector management logic 140 writes the specific sector number of each dead sector address to the volatile memory space (e.g., logic 140 programs each flopped register with a sector number). The process continues to operation 610, where memory controller 130 begins the search action, which is implemented as an automatic action, such as being implemented in hardware. In embodiments where the search action is implemented in hardware, the following operations are also implemented in hardware (e.g., operations 615-640).

The process continues to operation 615, where sector address comparator 325 compares the current record address with the dead sector addresses 330. The current record address is generated by address generation unit 310, where the current record address compared during a first iteration of operation 615 is the last written location in NVM array 135 that contains the newest record written to NVM array 135. In other embodiments, sector address comparator 325 compares the specific sector number of the current record address with the specific sector number of each dead sector address.

The process continues to operation 620, where sector address comparator 325 determines whether the current record address is found in the dead sector addresses (or the current sector number matches a sector number of one of the dead sector addresses). If the current record address (or current sector number) is found, the current record address is determined to be located in a dead sector (e.g., a sector with dead status or read-only-to-dead status) and the process continues to operation 630, where the record data that is read from the current record address is identified as invalid and is ignored. As discussed above, logic gate 320 outputs an EEE control signal 345 that indicates to EEE control logic 335 that the record data is invalid, where EEE control logic 335 is configured to discard the record data in response to the EEE control signal 345 (and not use the record data to search for the requested data).

The process continues to operation 635, where memory controller 130 determines whether the search action is complete (e.g., all valid record data of NVM array 135 has been searched for the requested data). If the search action is not complete, the process continues to operation 640, where address generation unit 310 proceeds to the next record address of NVM array 135. Address generation unit 310 is configured to generate a logically sequential address for a next location in NVM array 135 (such as by decrementing the address to a previously written location). The process then returns to operation 615, where sector address comparator 325 compares the current record address (which is the next record address of operation 640) with the dead sector addresses. In other embodiments, comparator 325 compares the sector number of the current record address with the dead sector numbers. Thus during the search action, address generation unit 310 iterates back through the locations in NVM array 135, ignoring those locations in dead sectors. Returning to operation 635, if the search action is complete, the process ends.

Returning to operation 620, if the current record address is not found in dead sector addresses 330, the current record address is determined to be located in a non-dead sector (e.g., a sector with read-only status or healthy status) and the process continues to operation 625, where the record data that is read from the current record address is determined to be valid and is used to search for the requested data. As discussed above, logic gate 320 outputs the EEE control signal 345 that indicates to EEE control logic 335 that the record data is valid, where EEE control logic 335 is configured to search the record data for the requested data. The process then continues to operation 635, as discussed above.

Figure 7:
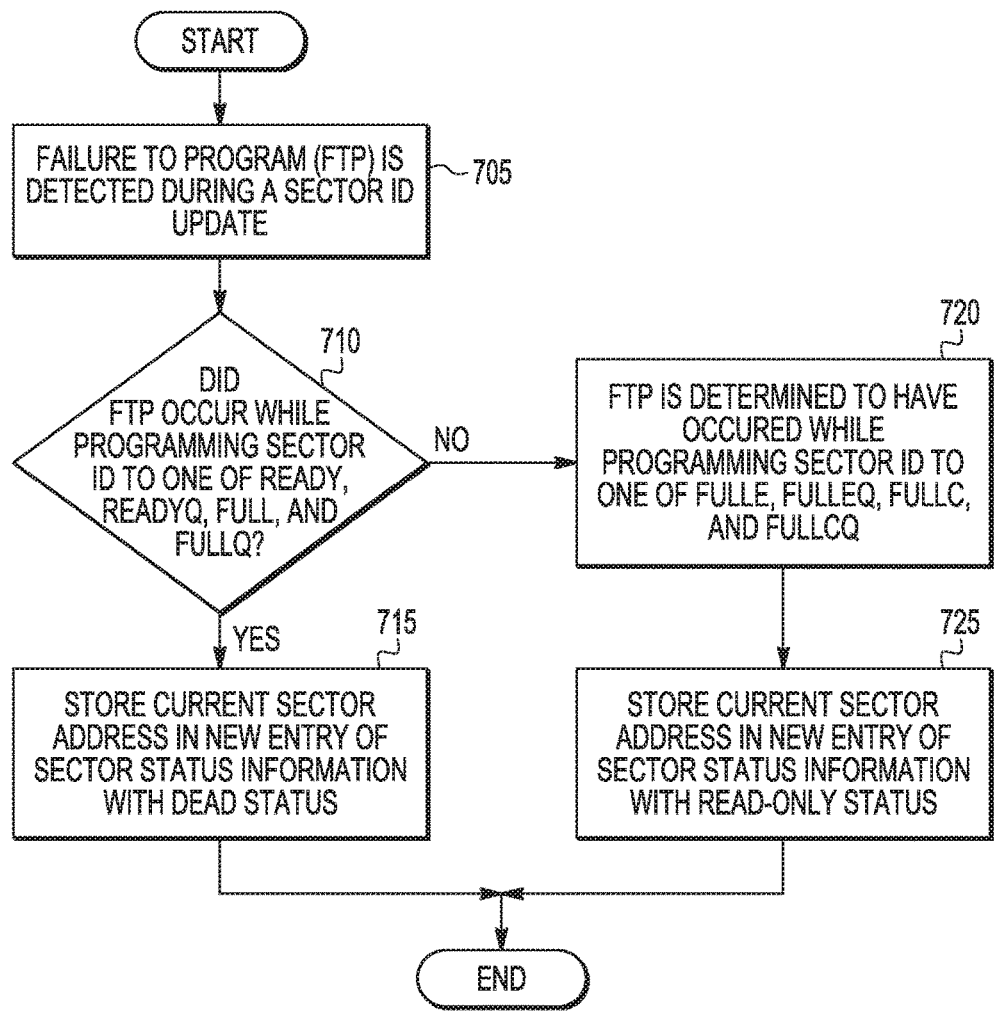
FIGS. 7 and 8 illustrate flowcharts depicting sector status information population processes implemented by sector management logic, according to some embodiments.

FIG. 7 illustrates a flowchart depicting a sector status information population process implemented by memory controller 130 and sector management logic 140. The process begins at operation 705, where memory controller 130 detects a failure to program (FTP) error during a sector ID update of a current sector. Sector IDs of sectors having healthy status are updated or progressed through sector lifecycle stages, as discussed above. The process continues to operation 710, where sector management logic 140 determines whether the FTP error occurred while attempting to program the sector ID to one of the lifecycle stages of READY, READYQ, FULL, and FULLQ. If so, the process continues to operation 715, where sector management logic 140 stores the sector address of the current sector in a "new" entry of sector status information with dead status. In some embodiments, each sector stores an existing default sector status entry (e.g., default sector status entry 450(1)), where the current sector's existing default entry is updated to a "new" dead entry (e.g., dead entry 450(8)) with the sector address of the current sector and dead status (e.g., dead status bits 420 and 425 set to dead indicator value, 0x0). In other embodiments, a new sector status entry is generated for the current sector at this time, the new entry having the sector address of the current sector and dead status. The process then ends.

Returning to operation 710, if the FTP error did not occur while attempting to program sector ID to one of the lifecycle stages of READY, READQ, FULL, and FULLQ, the process continues to operation 720, where sector management logic 140 determines that the FTP error occurred while attempting to program sector ID to one of lifecycle stages of FULLE, FULLEQ, FULLC, and FULLCQ. The process continues to operation 725, where sector management logic 140 stores the sector address of the current sector in a "new" entry of sector status information with read-only status. In some embodiments, each sector stores an existing default sector status entry (e.g., default sector status entry 450(1)), where the current sector's existing default entry is updated to a "new" read-only entry (e.g., read-only entry 450(4)) with the sector address of the current sector and read-only status (e.g., read-only status bits 410 and 415 are set to read-only indicator value, 0x0). In other embodiments, a new sector status entry is generated for the current sector at this time, the new entry having the sector address of the current sector and read-only status. The process then ends.

Figure 8:
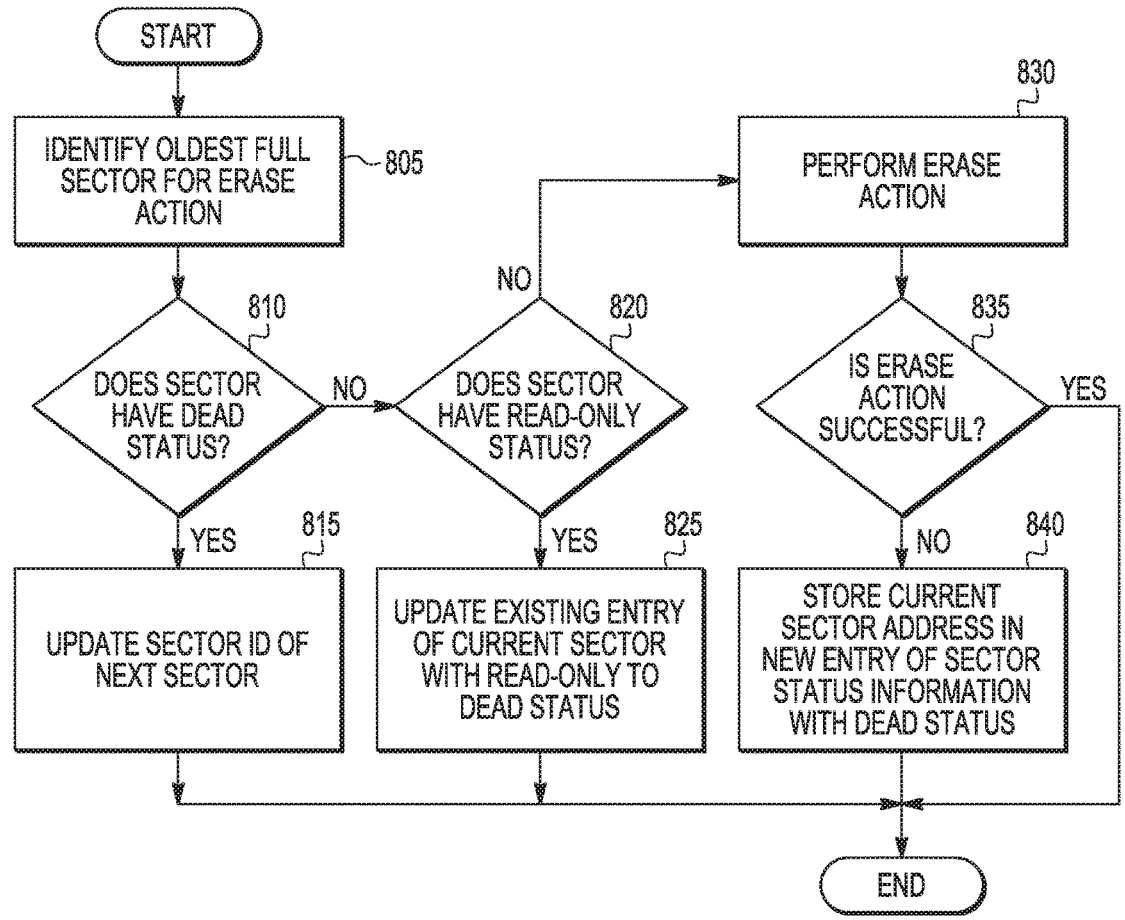

FIG. 8 also illustrates a flowchart depicting a sector status information population process implemented by memory controller 130 and sector management logic 140. The process begins at operation 805, where memory controller 130 identifies the oldest full sector for an erase action. The process continues to operation 810, where sector management logic 140 determines whether the oldest full sector has dead status. If so, the process continues to operation 815, where sector management logic 140 updates the sector ID of the next sector that does not have dead status or read-only-to-dead status, indicating the next sector should be compressed. The next sector will be erased after compression. If the next sector has dead status or read-only-to-dead status, sector management logic 140 continues to the following next sector until sector management logic 140 is successful in updating a sector ID. If the sector ID of the next sector that does not have dead status or read-only-to-dead status fails to be programmed or updated, sector management logic 140 changes the sector status of the next sector in a subsequent or concurring process (e.g., as illustrated in FIG. 7), as discussed above. The process then ends.

Returning to operation 810, if the oldest full sector does not have dead status, the process continues to operation 820, where sector management logic 140 then determines whether the current sector has read-only status. If so, the process continues to operation 825, where sector management logic 140 updates the existing sector status entry of the current sector (e.g., read-only entry 450(4)) with read-only-to-dead status (e.g., dead status bits 420 and 425 are set to dead indicator value, 0x0, resulting in a read-only-to-dead entry 450(6)). The process then ends.

Returning to operation 820, if the sector does not have read-only status, the process continues to operation 830, where memory controller 130 performs the erase action. The process continues to operation 835, where memory controller 130 confirms whether the erase action is successful. If so, the process then ends. If the erase action is not successful, the process continues to operation 840, where sector management logic 140 stores the current sector address in a "new" entry of sector status information with dead status. In some embodiments, each sector stores an existing default sector status entry (e.g., default sector status entry 450(1)), where the current sector's existing default entry is updated to a "new" dead entry (e.g., dead entry 450(8)) with the sector address of the current sector and dead status (e.g., dead status bits 420 and 425 are set to dead indicator value, 0x0). The process then ends.

Figure 9:
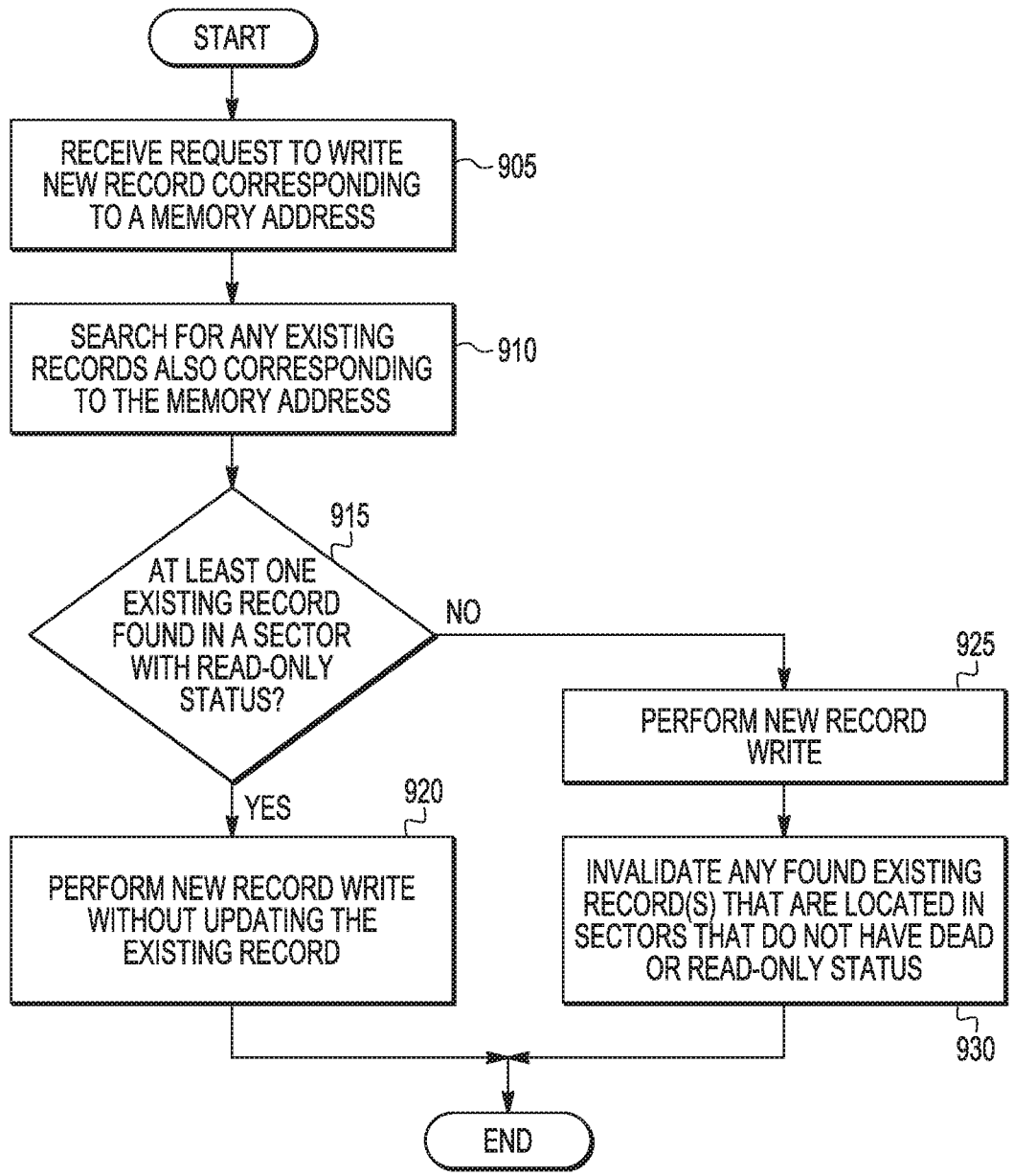
FIG. 9 illustrates a flowchart depicting a record write process implemented by sector management logic, according to some embodiments.

FIG. 9 illustrates a flowchart depicting a record write process implemented by sector management logic 140. The process illustrated in FIG. 9 is triggered in response to detection of an update to RAM 125 that requires record data corresponding to the RAM update to be written to NVM array 135 (e.g., the data that is currently stored at the RAM location is different from the new write data associated with the update for that RAM location). The process starts at operation 905, where memory controller 130 receives a request to write a new record to NVM array 135, where the new record corresponds to a memory address of RAM 125. As discussed above, the new record includes record data associated with an update to RAM 125, such as the RAM memory address (or access address) and the associated write data stored at that memory address. The process continues to operation 910, where memory controller 130 searches for any existing records in NVM array 135 that also correspond to the memory address. The process continues to operation 915, where sector management logic 140 determines whether at least one existing record found in a sector with read-only status. If so, the process continues to operation 920, where sector management logic 140 performs the new record write without updating the existing record(s). The process then ends.

Returning to operation 915, if no existing records are found, the process continues to operation 925, where memory controller 130 performs the new record write. It is noted that memory controller 130 writes the new record into a sector of NVM array 135 with healthy status. AGU 310 of memory controller 130 takes sector status into account when generating an address in NVM array 135 to which the new record will be written, avoiding or skipping any sectors having dead status, read-only status, or read-only-to-dead status. The process continues to operation 930, where memory controller 130 invalidates any found existing record(s) that are located in sectors that do not have a dead or read-only status (e.g., sectors with healthy status). The process then ends.

By now it should be appreciated that there has been provided a high voltage failure recovery scheme for an EEE memory system that tracks the status of sectors in the EEE memory system and uses the sector status to determine when to perform high voltage operations on a sector, as well as when to discard invalid data read from a failed sector.

In one embodiment of the present disclosure, a semiconductor memory system is provided, which includes a volatile memory; a non-volatile memory including a plurality of sectors, each of the plurality of sectors configured to store one or more data records; and a memory controller coupled to the volatile memory and the non-volatile memory. The memory controller includes a sector management logic circuit configured to: receive a record address and a read control signal, where the record address identifies a location in the non-volatile memory. The sector management logic circuit is also configured to compare the record address with a plurality of dead sector addresses, where the dead sector addresses correspond to a set of sectors located in the non-volatile memory. The sector management logic circuit is also configured to output a memory control signal that is active in response to a combination of a first detection that the record address matches one of the dead sector addresses and a second detection that the read control signal indicates a read operation is requested to be performed on the non-volatile memory, where the memory control signal that is active indicates that data located at the record address is invalid.

One aspect of the above embodiment provides that the memory controller further includes an address generation circuit and a memory control logic circuit, the sector management logic circuit is configured to receive the record address and the read control signal from the address generation circuit, and the sector management logic circuit is configured to output the memory control signal to the memory control logic circuit.

Another aspect of the above embodiment provides that the sector management logic circuit includes a sector comparator that is configured to: perform a comparison of the record address with the dead sector addresses, and output a read disable signal based on the comparison, where the read disable signal is active in response to the first detection that the record address matches one of the dead sector addresses.

A further aspect of the above embodiment provides that the read disable signal is inactive in response to a third detection that the record address does not match one of the dead sector addresses, the memory control signal is inactive in response to a combination of the third detection and the second detection, and the memory control signal that is inactive indicates that data located at the record address is valid.

Another further aspect of the above embodiment provides that the sector management logic circuit further includes a logic gate circuit that is configured to output the memory control signal, the logic gate circuit having a first input coupled to the read control signal and a second input coupled to the read disable signal.

Another aspect of the above embodiment provides that the sector management logic circuit further includes a second volatile memory, and the dead sector addresses are stored in the second volatile memory.

A further aspect of the above embodiment provides that each dead sector address includes a set of bits that identifies a respective sector number of the set of sectors, the record address includes another set of bits that identifies a specific sector number in which the record address is located, the second volatile memory comprises a plurality of flopped registers, each of the flopped registers are configured to store one of the respective sector numbers of the dead sector addresses, and the sector comparator is further configured to compare the specific sector number with each of the respective sector numbers.

Another aspect of the above embodiment provides that each respective sector of the plurality of sectors is further configured to store a sector identifier (ID) that indicates an erase status of the respective sector, a failure status indicator that indicates a failure status of the respective sector, and a sector address of the respective sector.

A further aspect of the above embodiment provides that the sector management logic circuit is further configured to: identify sector addresses associated with failure status indicators having dead status bits set to a dead indicator value, and write the sector addresses to a second volatile memory as the dead sector addresses.

In another embodiment of the present disclosure, a method is provided for managing failing sectors in a semiconductor memory device that includes a volatile memory, a non-volatile memory, and a memory controller coupling the volatile memory and the non-volatile memory. The method includes receiving a record address and a read control signal, where the record address identifies a location in the non-volatile memory. The method also includes comparing the record address with a plurality of dead sector addresses, where the dead sector addresses correspond to a subset of sectors located in the non-volatile memory. The method also includes determining that data located at the record address is invalid in response to a combination of a first detection that the record address matches one of the dead sector addresses and a second detection that the read control signal indicates a read operation is requested to be performed on the non-volatile memory.

Another aspect of the above embodiment provides that the comparing the record address with the plurality of dead sector addresses comprises comparing a first set of bits of the record address to a second set of bits of each of the dead sector addresses, where the first set of bits identify a specific sector number in which the record address is located, and the second set of bits each identify a respective sector number of the dead sector addresses.

Another aspect of the above embodiment provides that the method further includes identifying an oldest full sector for an erase action, wherein the oldest full sector is associated with a failure status indicator having dead status bits and read-only bits.

A further aspect of the above embodiment provides that the method further includes, in response to determining that the dead status bits are set to a dead indicator value, updating a sector identifier (ID) of a next sector of the oldest full sector.

Another further aspect of the above embodiment provides that the method further includes, in response to determining that the dead status bits are set to a default indicator value and the read-only bits are set to a read-only indicator value, updating the dead status bits to a dead indicator value.

Another further aspect of the above embodiment provides that the method further includes, in response to determining that the dead status bits and the read-only bits are set to a default indicator value, performing the erase action on the oldest full sector; and in response to determining that the erase action failed, updating the dead status bits to a dead indicator value.

Another aspect of the above embodiment provides that the method further includes detecting that a failure to program (FTP) error occurred during a sector identifier (ID) update action for a sector, where the sector is associated with a failure status indicator having dead status bits and read-only status bits set to a default indicator value. The method also further includes, in response to determining the FTP error occurred while attempting to program the sector ID to one of a READY, READYQ, FULL, and FULLQ erase status, updating the dead status bits to a dead indicator value and storing a sector address of the sector; and in response to determining the FTP error occurred while attempting to program the sector ID to one of a FULLE, FULLEQ, FULLC, and FULLCQ erase status, updating the read-only status bits to a read-only indicator value and storing the sector address of the sector.

Another aspect of the above embodiment provides that the method further includes receiving a request to write a new record to the non-volatile memory, the new record comprising a memory address of the volatile memory; and searching for any existing records in the non-volatile memory that correspond to the memory address. The method also further includes; in response to finding at least one existing record located in a sector associated with a failure status indicator having read-only status bits set to a read-only indicator value, writing the new record to the non-volatile memory without updating the at least one existing record; and in response to not finding at least one existing record located in a sector associated with the failure status indicator having read-only status bits set to the read-only indicator value, writing the new record to the non-volatile memory, and invalidating any found existing records that are located in sectors that are associated with another failure status indicator having read-only status bits and dead status bits set to a default indicator value.

Another aspect of the above embodiment provides that the method further includes determining that data located at the record address is valid in response to a combination of a third detection that the record address does not match one of the dead sector addresses and the second detection, where the valid data is utilized in at least one of a copy down action and a search action.

In another embodiment of the present disclosure, a computer processing system is provided, the computer processing system including a volatile memory; a non-volatile memory including a plurality of sectors, each of the plurality of sectors configured to store one or more data records; and a control module coupled to the non-volatile memory and the volatile memory. The control module is configured to receive a record address and a read control signal, where the record address identifies a location in the non-volatile memory. The control module is configured to compare the record address with a plurality of dead sector addresses, where the dead sector addresses correspond to a set of sectors located in the non-volatile memory. The control module is configured to generate a memory control signal that is active in response to a combination of a first detection that the record address matches one of the dead sector addresses and a second detection that the read control signal indicates a read operation is requested to be performed on the non-volatile memory, where the memory control signal that is active indicates that data located at the record address is invalid.

Another aspect of the above embodiment provides that the memory control signal is inactive in response to a combination of a third detection that the record address does not match one of the dead sector addresses and the second detection, and the memory control signal that is inactive indicates that data located at the record address is valid.

Another aspect of the above embodiment provides that each respective sector of the plurality of sectors is further configured to store a sector identifier (ID) that indicates an erase status of the respective sector, a failure status indicator that indicates a failure status of the respective sector, and a sector address of the respective sector.

The semiconductor substrate described herein can be any semiconductor material or combinations of materials, such as gallium arsenide, silicon germanium, silicon-on-insulator (SOI), silicon, monocrystalline silicon, the like, and combinations of the above.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. For example, NVM array 135 may be located on a same integrated circuit as memory controller 130 or on a separate integrated circuit or located within another peripheral or slave discretely separate from other elements of system 100. Other modules 115 may also be located on separate integrated circuits or devices. Also for example, system 100 or portions thereof may be soft or code representations of physical circuitry or of logical representations convertible into physical circuitry. As such, system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for managing failing sectors in a semiconductor memory device that includes a volatile memory, a non-volatile memory, and a memory controller coupling the volatile memory and the non-volatile memory, the method comprising:
   detecting that a failure to program (FTP) error occurred during a sector identifier (ID) update action for a sector in the non-volatile memory, wherein
      the sector is associated with a failure status indicator that indicates healthy status;
   in response to determining the FTP error occurred while attempting to program a sector ID of the sector to one of a READY, READYQ, FULL, and FULLQ erase status, updating the failure status indicator to indicate a dead status; and
   in response to determining the FTP error occurred while attempting to program the sector ID to one of a FULLE, FULLEQ, FULLC, and FULLCQ erase status, updating the failure status indicator to indicate a read-only status.

2. The method of claim 1, wherein
the dead status indicates the sector contains invalid data and the sector is skipped during any subsequent read or write operations, and
the read-only status indicates the sector contains valid data for read operations and the sector is skipped during any subsequent write operations.

3. The method of claim 1, further comprising:
in response to determining the FTP error occurred while attempting to program the sector ID to one of READY, READYQ, FULL, and FULLQ erase status, storing a sector address of the sector and the failure status indicator that indicates the dead status in a new entry of sector status information, wherein
the sector status information is stored in a reserved location in the non-volatile memory.

4. The method of claim 1, further comprising:
in response to determining the FTP error occurred while attempting to program the sector ID to one of FULLE, FULLEQ, FULLC, and FULLCQ erase status, storing the sector address of the sector and the failure status indicator that indicates the read-only status in a new entry of sector status information, wherein
the sector status information is stored in a reserved location in the non-volatile memory.

5. The method of claim 1, wherein
the failure status indicator includes dead status bits and read-only status bits, and
the healthy status is indicated by the dead status bits storing a default value and the read-only status bits storing the default value.

6. The method of claim 5, wherein
the updating the failure status indicator to indicate the dead status comprises:
   programming the dead status bits to store a dead indicator value, wherein the read-only status bits continue to store the default value.

7. The method of claim 6, wherein
the programming the dead status bits is performed using multiple qualifications steps in a brownout tolerant manner.

8. The method of claim 5, wherein
the updating the failure status indicator to indicate the read-only status comprises:
   programming the read-only status bits to store a read-only indicator value, wherein
      the dead status bits continue to store the default value.

9. The method of claim 8, wherein
the programming the read-only status bits is performed using multiple qualifications steps in a brownout tolerant manner.

10. The method of claim 1, further comprising:
identifying a first sector in the non-volatile memory as an oldest full sector for an erase action, wherein the first sector is associated with a first failure status indicator; and
in response to determining that the first failure status indicator indicates the read-only status, updating the first failure status indicator to indicate a read-only-to-dead status.

11. The method of claim 10, wherein
the read-only-to-dead status indicates the first sector contains invalid data and the first sector is skipped during any subsequent erase operations and any subsequent read or write operations.

12. The method of claim 10, wherein
in response to determining that the first failure status indicator indicates either the dead status or the read-only-to-dead status, updating a sector ID of a next sector to identify the next sector as a new oldest full sector for the erase action, wherein
the next sector is associated with a second failure status indicator, and
the second failure status indicator does not indicate dead status and does not indicate the read-only-to-dead status.

13. The method of claim 10, further comprising:
in response to determining that the first failure status indicator indicates the healthy status, performing the erase action on the oldest full sector; and
in response to determining that the erase action failed, updating the first failure status indicator to the dead status.

14. The method of claim 13, wherein
the dead status indicates the first sector contains invalid data and the first sector is skipped during any subsequent erase operations and any subsequent read or write operations.

15. A method for managing failing sectors in a semiconductor memory device that includes a volatile memory, a non-volatile memory, and a memory controller coupling the volatile memory and the non-volatile memory, the method comprising:
receiving a request to write a new record to the non-volatile memory, the new record comprising a memory address of the volatile memory;
searching for any existing records in sectors of the non-volatile memory that correspond to the memory address;
in response to finding at least one existing record located in a first sector associated with a failure status indicator that indicates a read-only status,
writing the new record to a current sector of the non-volatile memory without updating the at least one existing record in the first sector, wherein the current sector is associated with a failure status indicator that indicates a healthy status.

16. The method of claim 15, wherein
the read-only status indicates the first sector contains valid data for read operations and the first sector is skipped during any write operations.

17. The method of claim 15, further comprising:
in response to not finding at least one existing record located in a first sector associated with the failure status indicator that indicates a read-only status,
writing the new record to the current sector of the non-volatile memory, and
invalidating any found existing records that are located in sectors that are associated with a failure status indicator that indicates healthy status.

18. The method of claim 15, wherein
the searching comprises skipping sectors associated with a failure status indicator that indicates a dead status or a read-only-to-dead status.

19. The method of claim 18, wherein
the dead status indicates that a sector contains invalid data and the sector is skipped during any subsequent read or write operations, and
the read-only-to-dead status indicates a sector contains invalid data and the sector is skipped during any subsequent read or write operations.

20. The method of claim 15, further comprising:
in response to the current sector becoming full, identifying a next sector as the current sector, wherein
any next sectors that are associated with a failure status indicator that indicates any one of the read-only status, a dead status, or a read-only-to-dead status are skipped until a next sector associated with a failure status that indicates a healthy status is reached.

* * * * *